United States Patent [19]
Skaja

[11] Patent Number: 6,098,313
[45] Date of Patent: *Aug. 8, 2000

[54] SHOE SOLE COMPONENT AND SHOE SOLE COMPONENT CONSTRUCTION METHOD

[75] Inventor: Joseph J. Skaja, San Antonio, Tex.

[73] Assignee: Retama Technology Corporation, Englewood, Colo.

[*] Notice: This patent is subject to a terminal disclaimer.

[21] Appl. No.: 08/376,298

[22] Filed: Jan. 23, 1995

Related U.S. Application Data

[63] Continuation of application No. 07/766,736, Sep. 26, 1991, abandoned.

[51] Int. Cl.⁷ .................................................. A43B 13/18
[52] U.S. Cl. .................................. 36/28; 36/29; 36/30 R; 36/35 R
[58] Field of Search .................................. 36/28, 30 R, 31, 36/35 R, 101, 15, 25 R, 34 R, 44, 43

[56] References Cited

U.S. PATENT DOCUMENTS

| | | | |
|---|---|---|---|
| Re. 32,394 | 4/1987 | Ehrlich | 36/33 |
| 957,394 | 5/1910 | Thoma . | |
| 1,539,283 | 5/1925 | Staats-Oels . | |
| 2,090,881 | 8/1937 | Wilson | 36/29 |
| 2,711,033 | 6/1955 | Dick | 36/33 |
| 2,739,093 | 3/1956 | Bull | 154/106 |
| 2,772,196 | 11/1956 | Pooley | 154/106 |
| 2,983,056 | 5/1961 | Murawski | 36/29 |
| 3,186,013 | 6/1965 | Glassman et al. | 12/146 |
| 3,327,334 | 6/1967 | Wilmanns et al. | 12/142 |
| 3,538,628 | 11/1970 | Einstein, Jr. | 36/15 |
| 3,608,215 | 9/1971 | Fukuoka | 36/29 |
| 3,766,669 | 10/1973 | Pearsall | 36/43 |
| 3,928,881 | 12/1975 | Bente | 12/142 |
| 4,044,479 | 8/1977 | Brutting | 36/32 |
| 4,151,661 | 5/1979 | Namba et al. | 36/30 |
| 4,170,078 | 10/1979 | Moss | 36/28 |
| 4,187,620 | 2/1980 | Selner | 36/28 |
| 4,223,455 | 9/1980 | Vermeulen | 36/29 |
| 4,223,456 | 9/1980 | Cohen | 36/29 |
| 4,236,326 | 12/1980 | Inohara | 36/29 |
| 4,239,476 | 12/1980 | Somberg | 425/556 |
| 4,251,932 | 2/1981 | Love | 36/7.4 |
| 4,262,433 | 4/1981 | Hagg et al. | 36/25 |
| 4,267,648 | 5/1981 | Weisz | 36/28 |
| 4,288,399 | 9/1981 | Siedenstrang | 264/25 |
| 4,297,797 | 11/1981 | Meyers | 36/44 |
| 4,299,038 | 11/1981 | Epple | 36/67 |
| 4,302,892 | 12/1981 | Adamik | 36/31 |
| 4,305,212 | 12/1981 | Coomer | 36/80 |
| 4,342,158 | 8/1982 | McMahon et al. | 36/35 |
| 4,347,637 | 9/1982 | Ardito | 12/142 |
| 4,356,642 | 11/1982 | Herman | 36/44 |
| 4,372,058 | 2/1983 | Stubblefield | 36/32 |
| 4,377,042 | 3/1983 | Bauer | 36/101 |
| 4,391,048 | 7/1983 | Lutz | 36/28 |
| 4,398,357 | 8/1983 | Batra | 36/30 |
| 4,400,483 | 8/1983 | Siedenstrang | 524/247 |
| 4,400,894 | 8/1983 | Ehrlich | 36/33 |

(List continued on next page.)

FOREIGN PATENT DOCUMENTS

| | | | |
|---|---|---|---|
| 2256-735 | of 1975 | France . | |
| 2250266 | 5/1975 | France | 36/30 R |
| 539530 | 2/1956 | Italy | 36/28 |
| 2225212 | 5/1990 | United Kingdom | 36/28 |
| 9111928 | 8/1991 | WIPO | 36/30 R |

*Primary Examiner*—Paul T. Sewell
*Attorney, Agent, or Firm*—Fulbright & Jaworski

[57] ABSTRACT

A high polymer resin material is configured into a shoe sole component having a plurality of inwardly extending indentations in one or both of the top and bottom members of the component. The indentations extend into the interval between the members and adjacent to the opposite member to provide support members for the sole component. The sole component can be constructed by molding upper and lower sole component halves wherein the molds are configured to provide indentations in the top and bottom members. The upper and lower sole component halves are then joined to complete the sole component.

14 Claims, 8 Drawing Sheets

U.S. PATENT DOCUMENTS

| | | | |
|---|---|---|---|
| 4,418,483 | 12/1983 | Fujita et al. | 36/28 |
| 4,439,936 | 4/1984 | Clarke et al. | 36/102 |
| 4,445,283 | 5/1984 | Meyers | 36/29 |
| 4,449,307 | 5/1984 | Stubblefield | 36/32 |
| 4,455,765 | 6/1984 | Sjosward | 36/30 |
| 4,458,430 | 7/1984 | Peterson | 36/28 |
| 4,494,320 | 1/1985 | Davis | 36/25 |
| 4,497,123 | 2/1985 | Ehrlich | 36/32 |
| 4,510,702 | 4/1985 | Ehrlich, Jr. | 36/86 |
| 4,523,393 | 6/1985 | Inohara | 36/29 |
| 4,535,553 | 8/1985 | Derderian et al. | 36/28 |
| 4,538,366 | 9/1985 | Norton | 36/32 |
| 4,546,555 | 10/1985 | Spademan | 36/35 |
| 4,553,342 | 11/1985 | Derderian et al. | 36/97 |
| 4,562,651 | 1/1986 | Frederick et al. | 36/102 |
| 4,616,431 | 10/1986 | Dassler | 36/28 |
| 4,619,055 | 10/1986 | Davidson | 36/28 |
| 4,624,061 | 11/1986 | Wezel et al. | 36/30 |
| 4,635,384 | 1/1987 | Huh et al. | 36/29 |
| 4,657,716 | 4/1987 | Schmidt | 264/45.7 |
| 4,667,423 | 5/1987 | Autry et al. | 36/102 |
| 4,670,995 | 6/1987 | Huang | 36/29 |
| 4,672,754 | 6/1987 | Ehrlich | 36/85 |
| 4,676,010 | 6/1987 | Cheskin | 36/32 |
| 4,722,131 | 2/1988 | Huang | 29/450 |
| 4,730,402 | 3/1988 | Norton et al. | 36/30 |
| 4,741,114 | 5/1988 | Stubblefield | 36/32 |
| 4,753,021 | 6/1988 | Cohen | 36/28 |
| 4,759,136 | 7/1988 | Stewart et al. | 36/30 R |
| 4,763,426 | 8/1988 | Polus et al. | 36/29 |
| 4,768,295 | 9/1988 | Ito | 36/28 |
| 4,798,009 | 1/1989 | Colonel et al. | 36/30 R |
| 4,815,221 | 3/1989 | Diaz | 36/27 |
| 4,817,304 | 4/1989 | Parker et al. | 36/114 |
| 4,823,483 | 4/1989 | Chapnick | 36/43 |
| 4,831,750 | 5/1989 | Muller | 36/28 |
| 4,843,741 | 7/1989 | Yung-Mao | 36/114 |
| 4,845,861 | 7/1989 | Moumdjian | 36/29 |
| 4,845,863 | 7/1989 | Yung-Mao | 36/114 |
| 4,856,208 | 8/1989 | Zaccaro | 36/29 |
| 4,858,343 | 8/1989 | Flemming | 36/128 |
| 4,876,053 | 10/1989 | Norton et al. | 264/255 |
| 4,887,369 | 12/1989 | Bailey | 36/101 |
| 4,912,861 | 4/1990 | Huang | 36/29 |
| 4,918,841 | 4/1990 | Turner et al. | 36/114 |
| 4,920,663 | 5/1990 | Flemming | 36/73 |
| 4,922,630 | 5/1990 | Robinson | 36/89 |
| 4,922,631 | 5/1990 | Anderie | 36/102 |
| 4,930,231 | 6/1990 | Liu | 36/30 |
| 4,934,071 | 6/1990 | Virgini | 36/29 |
| 4,972,611 | 11/1990 | Swartz et al. | 36/28 |
| 4,984,320 | 1/1991 | Curley, Jr. et al. | 12/146 |
| 4,993,173 | 2/1991 | Gardiner | 36/3 |
| 4,999,931 | 3/1991 | Vermeulen | 36/30 R |
| 5,014,449 | 5/1991 | Richard et al. | 36/114 |
| 5,042,174 | 8/1991 | Nichols | 36/25 |
| 5,042,175 | 8/1991 | Ronen et al. | 36/28 |
| 5,042,176 | 8/1991 | Rudy | 36/29 |
| 5,044,096 | 9/1991 | Polegato | 36/3 |
| 5,046,267 | 9/1991 | Kilgore et al. | 36/114 |
| 5,048,203 | 9/1991 | Kling | 36/32 |
| 5,092,060 | 3/1992 | Frachey et al. | 36/29 |
| 5,097,607 | 3/1992 | Fredericksen | 36/291 |
| 5,131,174 | 7/1992 | Drew et al. | 36/35 |
| 5,381,607 | 1/1995 | Sussmann | 36/28 |

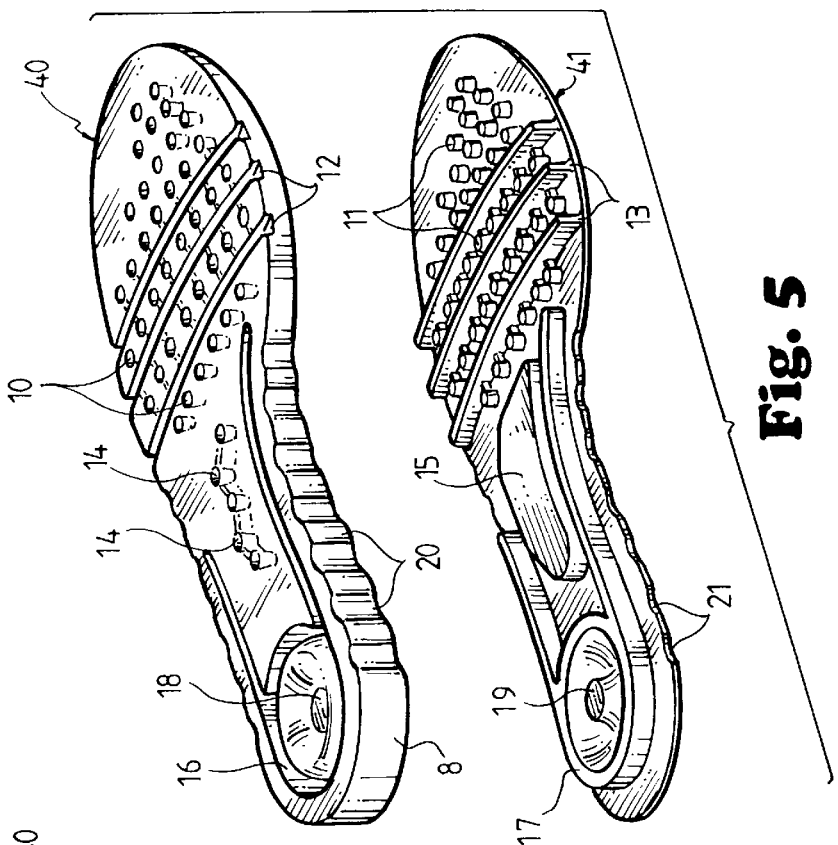
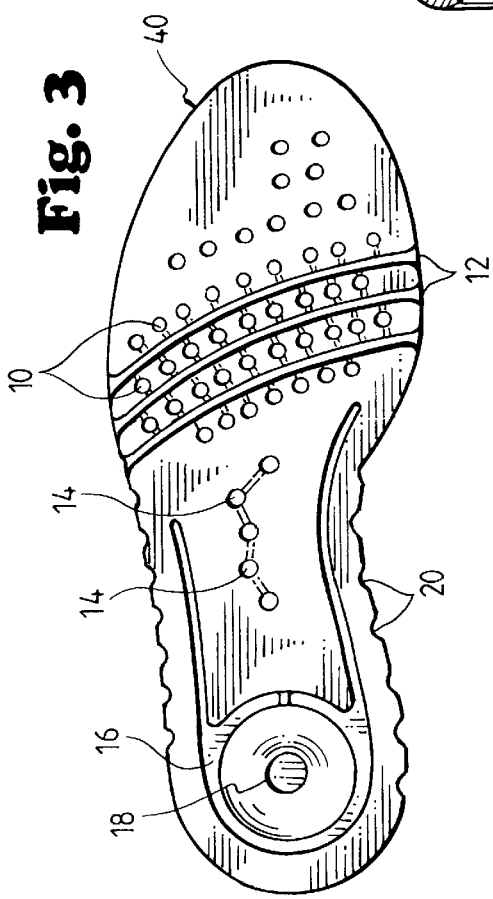
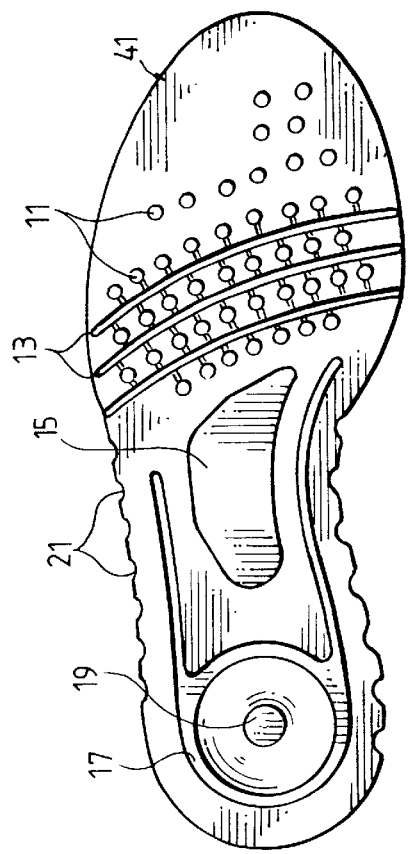
Fig. 3
Fig. 4
Fig. 5

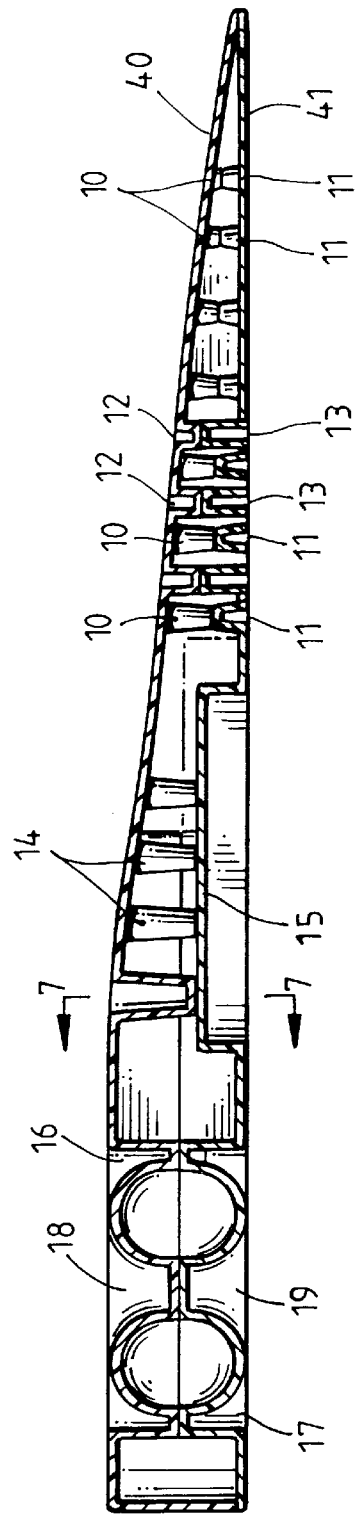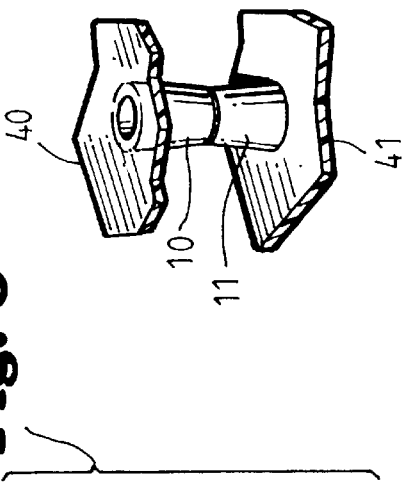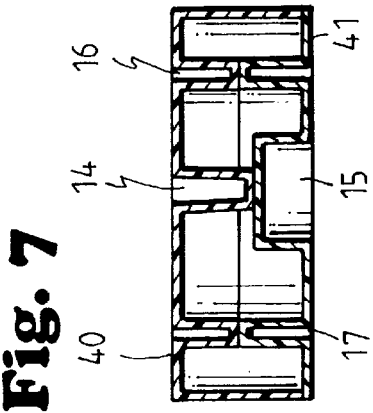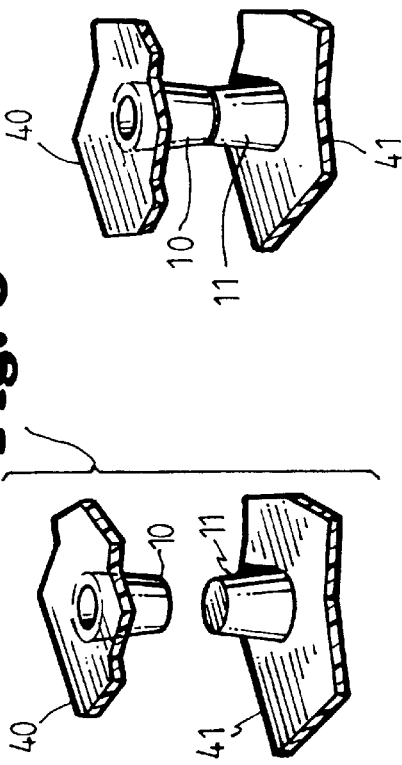

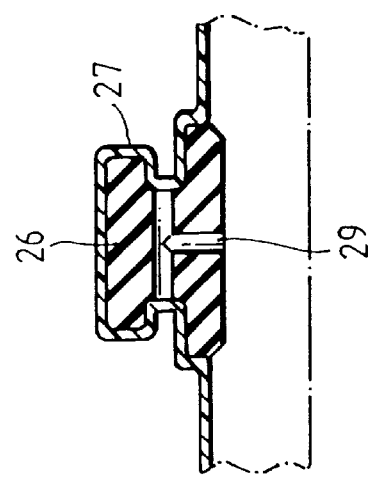
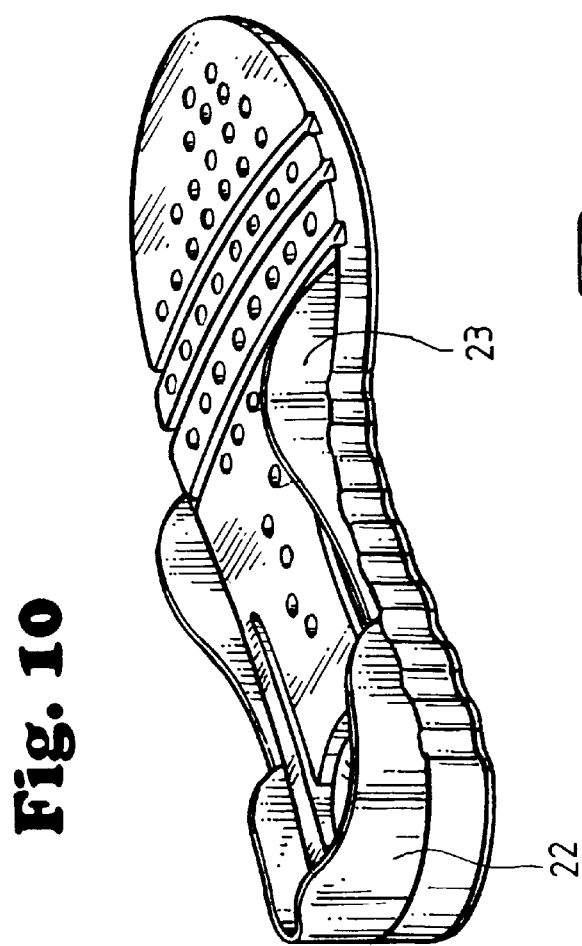
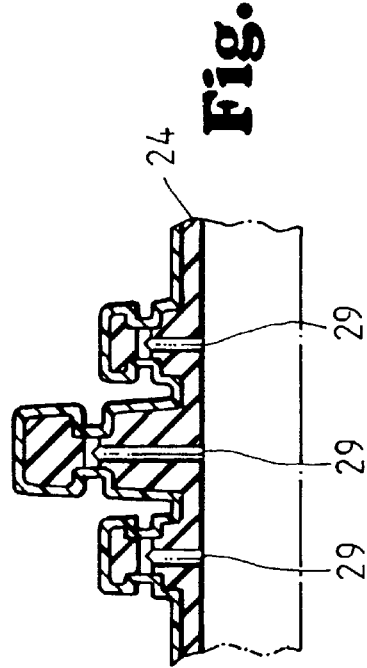

VACUUM PORT

SHOE SOLE COMPONENT AND SHOE SOLE COMPONENT CONSTRUCTION METHOD

This application is a continuation of application Ser. No. 07/766,736, filed Sep. 26, 1991 now abandoned.

I. BACKGROUND OF THE INVENTION

The present invention relates to shoe soles and shoe sole components and to methods of manufacturing shoe soles and shoe sole components. More particularly, the invention relates to a flexible high polymer resin shoe sole or sole component and a method of thermoforming a shoe sole or sole component.

A shoe generally consists of two basic parts, an upper and a sole. The upper is generally designed to enclose and provide cushioning to the foot. The upper also typically includes an insole to provide initial support and cushioning to the bottom of the foot. The upper is attached to a sole which provides additional protection and cushioning primarily to the bottom of the foot. The sole also imparts stability to the shoe.

The increase in demand for shoes for sports and outdoor activities such as walking, running, hiking, tennis, basketball and numerous other high activity sports has prompted many advances in shoe design to provide improved protection and comfort to the feet, ankles, legs, hips, etc. Efforts to improve shoes have centered on decreasing shoe weight and improving cushioning, flexibility, and stability. In addition, shoe soles are desired with improved memory, shock dispersion capabilities and energy return.

The effort to design improved shoes has prompted increased study of foot dynamics in general and the study of foot dynamics as it relates to particular activities such as running, basketball and other specific activities. The combination of research and research responsive shoe design has resulted in shoes designed for specific activities. For example, the pressures exerted by a foot on a sole when walking are different from the pressures exerted by a foot when running, or when playing tennis, etc. Accordingly, the modern sport shoe design takes into account the specific requirements of shoes used for particular activities. In addition, modern sport shoe design attempts to take into account the specific needs of the individual, such as weight, foot width and other individual characteristics such as pronation and supination. Thus, general considerations such as shoe weight, cushioning, flexibility and stability are taken into account in designing sport shoes for particular activities and individual needs. Although the functional characteristics of the shoe are of primary importance, other factors such as cost and appearance of the shoe must be taken into account for full consumer satisfaction.

Sport shoe refinements have concentrated particularly on the sole. Sport shoe soles typically have two components, the midsole and the outsole. The outsole is the ground-contacting portion of the sole and provides traction and protection to the remainder of the sole. Outsoles, accordingly, are composed of durable materials, such as rubber, which provide both traction and high abrasion resistance. The midsole contributes to foot stability and is the primary shock absorption member of the sole. The midsole is composed generally of a softer, more flexible material than the outsole. Since the midsole is important to such factors as stability and shock absorption, the design of the midsole has received considerable attention by sport shoe manufacturers.

Typically, midsole construction centers around plastics expanded into foams which are then shaped in a number of ways to accommodate a shoe upper. The foam midsole is then covered with a more durable sheet of outsole material, usually rubber, to provide the sole with adequate abrasion resistance and traction. Attaching an outsole to a foam midsole is generally a labor-intensive process. For example, attaching a rubber outsole to a midsole requires abrading the surface of the midsole, washing the surface with a solvent, layering both the midsole and outsole surfaces with cement where they are to be joined, then activating the treated surfaces, usually with heat. This is followed by touch-up and decoration processes.

A foam midsole material by itself is generally inadequate to provide the stability and cushioning demanded for modern sport shoes. The foams used in current soles have insufficient external surface tension by themselves to provide the required stabilizing forces in response to pressures exerted on a sole. This is especially true with extremely low density foams employed to minimize weight. Moreover, current foam midsoles quickly lose their ability to adequately cushion, often after as little as 20% of the shoe life.

The problems of stability and cushioning associated with the use of foam midsoles has prompted several approaches for increasing stability and prolonging the cushioning properties of midsoles. Efforts to improve stability have centered on the use of inserts of denser, more rigid materials than the main midsole component, such as dense foam plugs or solid thermoplastic inserts. These are either inserted directly into the foam midsole component before curing or cemented into place afterwards in another labor-intensive process. Efforts to improve cushioning while maintaining adequate stability have centered on the use of flexible thermoplastic inserts and liquid or gas filled inserts. These inserts also are generally encapsulated in the main midsole component. Thus, modern sole design has centered on constructing soles having varying degrees of flexibility in selected areas of the sole. For example, inserts can include foamed plugs of material harder or softer than the main midsole component. As stated, the inserts are typically encapsulated in the midsole material to provide areas in the midsole of lesser flexibility where increased stability is desired, and areas of greater flexibility where increased cushioning is desired. Other approaches include the use of resilient spheres embedded in the midsole by casting or injection molding the midsole around the spheres. Trampoline devices incorporated into the heel region of shoes have been attempted, but cost and appearance factors have limited the use of this concept. Various gels and gases have also been incorporated into midsoles in an attempt to enhance and prolong cushioning and energy return. However, soles incorporating gels or gases such as air are costly to manufacture and relatively unpredictable in their functional characteristics.

Midsoles have also been constructed of a shell of a thermoplastic elastomer designed to encapsulate and protect low density synthetic foams such as polyether, polyurethane or polyester polyurethane. Increased rigidity along the periphery of the sole is provided by convolutions in the shell material along the edge of the sole. Plugs of denser foam are still incorporated into the main foam component where more rigidity in the inner foam component is desired. Moreover, such shells are generally made by blow molding the thermoplastic material. Blow molding involves costly molds, which limit the size and number of design changes. Additionally mold costs become a significant factor when the number of shoe sizes for each shoe model is taken into account. This is reflected in higher sole unit costs. Thus, shoes manufactured by blow molding techniques are limited to higher priced shoes although the gain in performance over traditional sport shoes employing foam midsoles is not particularly significant since the interior of the shell sole is still composed of foam which breaks down and loses its cushioning effect in a relatively short period of time. Because of the cost involved in manufacturing such soles, their use has been limited primarily to heel components. Accordingly, shoe sole components are desired having improved performance and cost effectiveness.

II. SUMMARY OF THE INVENTION

The present invention is a shoe sole component comprising a sole component body member constructed from a flexible high polymer resin. The sole component is characterized by a top foot-platform member which can be directly or indirectly connected to a shoe upper. The component further comprises a corresponding bottom member which can be used either as the ground contacting member or for attachment to an outsole material. Internal support members for the sole component are provided by indentations in one or both of the top and bottom members. The indentations extend into the interval between the top and bottom members and can contact or bridge with the opposite component member. The support members formed by the indentations in the flexible sole component material provide flexible resistance to compressive forces exerted on the sole component. The component can also include a wall member coextensive with the top and bottom members.

The shoe sole component can be constructed through molding sheets of plastic resin in molds configured to form shapes for incorporation into shoe soles and with protrusions to provide the indentations in the material for the support members. One mechanism for forming the sole component of the present invention is through thermoforming. Generally, thermoforming is a process of shaping plastic resin by heating a sheet or film of the plastic to a temperature at which the resin is sufficiently pliable to be shaped into a desired form and then forcing the material into a one-sided mold. The sole component of the invention is preferably constructed by (1) heating a first thermoplastic sheet to its forming temperature, (2) heating a second thermoplastic sheet to its forming temperature, (3) forcing the first thermoplastic sheet into a first mold configured to provide an upper sole component half having a top foot-platform member and forcing the second thermoplastic sheet into a second mold configured to provide a lower sole component half having a bottom member, and (4) joining together the two molded halves by bonding, gluing, welding, fusing, coupling or the like. The mold halves are configured to indent either or both of the top and bottom members at selected points to provide internal support members. A particularly preferred construction method is to close together the mold halves while the material is at its forming temperature such that the sole component halves are fused or welded together at their contact points.

The support members can be thermoformed into a variety of shapes and sizes to provide specific areas of differing degrees of flexibility for stability and cushioning. For example, inwardly directed indentations can take the shape of conal-shaped pins which extend from either the top or bottom member and engage the opposite member. The pins can be grouped closer together where greater resistance is required for areas where a foot exerts the greatest pressure such as in the forefoot and heel regions of the sole. Pins can be grouped further apart or replaced by larger support members in weight bearing areas to increase cushioning. Support members can also be provided by indentations from the top foot-platform member extending into and contacting a corresponding indentation from the bottom member. The corresponding indentations can be fused or welded together during the thermoforming process to provide an internal support member combination bridging the top and bottom members of the sole component.

In addition, forming the sole component from two sheets of thermoplastic resin allows the sole component to be constructed of two different materials having different properties to create a variety of functional responses difficult to achieve through the use of only one material. For example, the bottom member can be constructed of a thermoplastic which is thicker, and accordingly stiffer, while the top member is constructed of a thermoplastic which is thinner and more flexible. In addition, support members constructed by corresponding indentations extending from the top and bottom members made of different materials can provide support members having dual properties. For example, the lower portion of the support member provided from the stiffer thermoplastic material will provide a stiffer support member portion and thus will provide greater resistance to forces exerted on the bottom portion of the sole. The upper portion of the support member constructed from the indentation of the thinner, more flexible material will exhibit greater flexibility, and accordingly provide more cushioning in response to pressures exerted on the top member of the sole component. By varying the shapes and sizes of the support members and the properties of the thermoplastic materials employed, the designer can control stability and cushioning characteristics throughout the sole component.

III. BRIEF DESCRIPTION OF THE DRAWINGS

FIG. 3 is a top plan view of the sole component embodiment shown in FIG. 2.

FIG. 4 is a bottom plan view of the sole component embodiment shown in FIG. 2.

FIG. 5 is a perspective view of unjoined sole component halves showing the internal structure of the sole component embodiment shown in FIG. 2.

FIG. 6 is a cross sectional view of the sole component embodiment taken along line 4—4 in FIG. 2.

FIG. 7 is a cross sectional view of the sole component embodiment take along line 5—5 in FIG. 2.

FIG. 8 is a perspective view of unjoined internal support members according to one embodiment of the present invention.

FIG. 9 is a perspective view of joined internal support members illustrated in FIG. 8.

FIG. 10 is a perspective view of one embodiment of the present invention showing a cup sole embodiment.

FIG. 14 is a cross sectional view of the mold illustrated in FIG. 12 showing an outsole member recessed in the mold and in locking engagement with sole component material.

FIG. 15 is a cross sectional view of an outsole member having a plurality of protrusions in locking engagement with sole component material.

Figure 19:
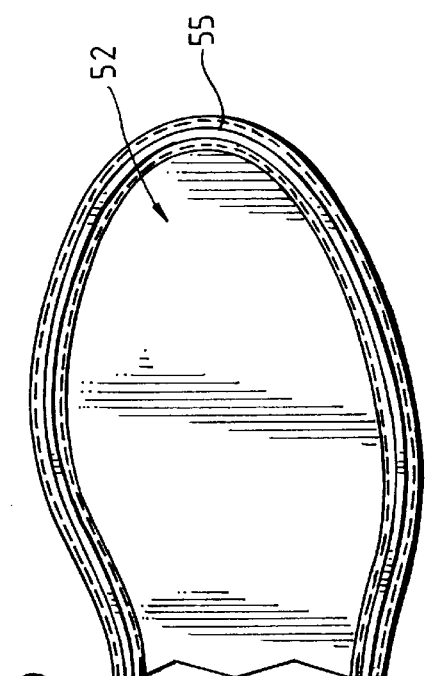

FIG. 19 a bottom plan view of a shoe upper according to one embodiment of the present invention showing one half of one alternative attachment means.

Figure 20:
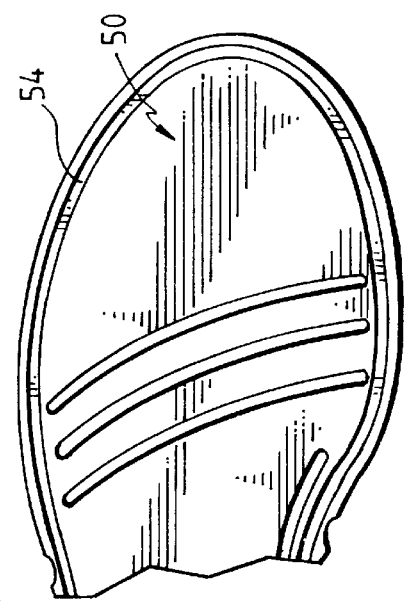

FIG. 20 is a top plan view of a sole component according to one embodiment of the present invention showing the corresponding attachment means illustrated in FIG. 19.

Figure 21:
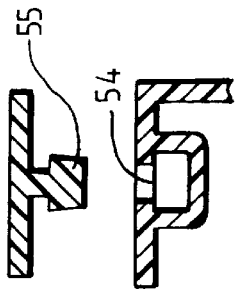

FIG. 21 is a side cross sectional view of the shoe upper and sole component attachment means shown in FIGS. 19–20.

IV. DETAILED DESCRIPTION AND PREFERRED EMBODIMENTS

The present invention is a shoe sole component made of a flexible high polymer plastic resin. The sole component can comprise the entire shoe sole or a portion of the sole such as a midsole, heel section, arch section or forefoot section. Depending on how the component is used, the component's general shape is configured for incorporation into a shoe sole. For example, if the sole component comprises the entire shoe sole, the component is configured to cooperate with a shoe upper, e.g., the sole is shaped to match and to accommodate a shoe upper. If the component comprises a portion of a sole, the component is configured to cooperate with the other portions of the sole to complete the sole. For example, the sole component can form the heel portion of a sole in conjunction with other sole materials such as traditional ethylene-vinyl acetate copolymer (EVA) foam midsole portions and outsole materials. If the sole component is a midsole, the midsole is configured to accommodate a shoe upper and an outsole.

The sole component generally consists of one or more high polymers, generally synthetic, which can be molded or formed by heat and pressure. Preferably, the high polymers are thermoplastic polymers or thermoplastic polymers which can be made into thermoset polymers following molding. The polymer is formed into a body member configured for use as a shoe sole or as a portion of a shoe sole. Regardless of the specific role of the sole component, the body member generally comprises a top foot-platform member and an opposing bottom member. The top foot-platform member is the surface of the body member oriented towards the shoe upper. Other various intermediate materials can be disposed between the top member and the upper. The body member further comprises a bottom member which is the portion of the component body member oriented towards the ground-contacting portion of the sole. The bottom member is in at least partially coextensive relation to the top member. The coextensive relation between the top and bottom members defines corresponding portions between the top and bottom members. Moreover, the top and bottom members are disposed in at least partially spaced relation to each other. For example, where the body member is to function as a sole or midsole component, the top and bottom members are spaced apart in a generally parallel planar relationship from the heel region through the mid section of the component. However, as the top and bottom members extend through the forefoot region, the members can taper towards each other and eventually meet. In any event, the members are at least in partially spaced relation to one another such that the spaced relation defines an interval between the top and bottom members.

Disposed in the interval between the top and bottom members are a plurality of support members. The support members are comprised of inwardly directed indentations in one or both of the top and bottom members. The indented portions of the body member extend into the interval to a point adjacent the corresponding portion of the opposite member. Adjacent as used in describing the present invention means that the indentation extends to a point which is at least proximate the corresponding portion of the opposing member and can be engaged with the opposite portion. The engagement can be fixed or non-fixed. In one embodiment of the present invention, one or more of the support members are fixedly engaged or are joined to the corresponding portion of the opposite member to retain the top and bottom members in their coextensive and spaced relation. In another embodiment of the present invention, the top and bottom members can be retained in their spaced and coextensive relation by coupling members extending between the top and bottom members. In this instance, support members can be in a fixed or non-fixed relation as design criteria indicate.

In another embodiment of the present invention, the body member further comprises a wall member which is coextensive with at least a portion of the periphery of the top and bottom members. In this embodiment, the wall member can join the top and bottom members to retain the members in their spaced and coextensive relation. Moreover, where the wall member is continuous along the periphery of the top and bottom members, the cooperation among the top, bottom and wall members serves to define a shell having internal support members formed from inwardly directed indentations extending into the shell interior and adjacent to corresponding portions of the opposite member.

As indicated, the support members are integral portions of the sole component comprising inwardly directed indentations in the polymer materials forming the top and bottom members of the sole component. The support members provide mechanical levers which provide a controlled collapsing of the material to create areas of cushioning and stability in the component. The support members are configured to extend into the interval between the top and bottom members and adjacent the opposing corresponding portion. The indentations can be formed in one or both of the top and bottom members. Moreover, the opposing corresponding portion can itself be an inwardly extending indented portion. In this instance, the opposing corresponding support members extend into the interval and adjacent to one another. Again, the corresponding indented portions are at least proximate to one another and can be engaged with one another in a fixed or non-fixed relation. The indented portion of the top or bottom members can be to any extent which retains enough of the top and bottom members' non-indented surface area to provide adequate support for use as a sole component. For example, components having an indented portion of about 50% are contemplated. To further illustrate the invention, reference is made to a preferred embodiment wherein the sole component is a midsole portion of a shoe sole.

Figure 1:
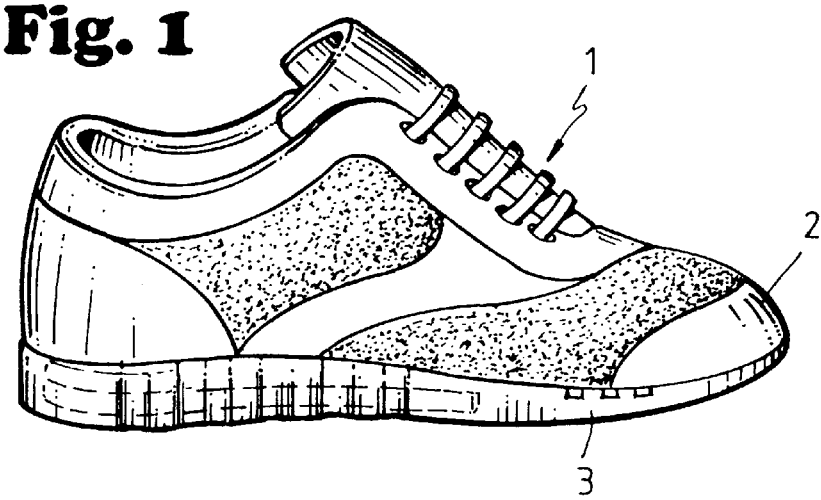
FIG. 1 is a side view of an athletic shoe having a sole component according to one embodiment of the present invention.
Figure 2:
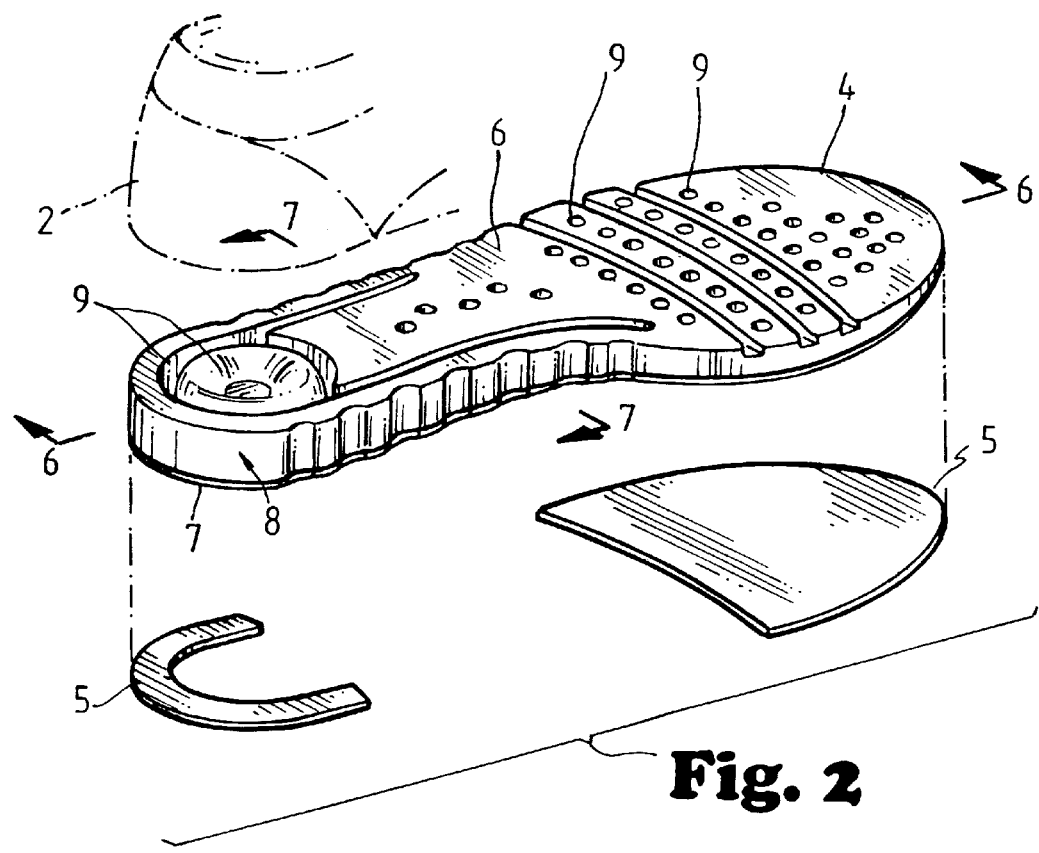
FIG. 2 is an exploded view of the athletic shoe shown in FIG. 1.

Referring to FIGS. 1–2, a shoe 1, such as a typical running shoe, is shown having an upper 2 and sole 3. The shoe upper has a lower surface configured for cooperative engagement with the sole. As indicated, the sole comprises a midsole 4 and outsole portions 5. The midsole is configured to cooperate with the sole engaging surface of the shoe upper. In the embodiment illustrated, the midsole 4 is a shell comprising a top foot-platform member 6, a bottom member 7, and a wall member 8. The top and bottom members are in generally parallel planar relation to each other in the heel and mid section of the sole, tapering towards each other as the midsole progresses towards the forefoot region and on to the front portion of the midsole where the top and bottom members meet. The top and bottom members are in coextensive relation and are partially spaced apart from one another to define an interval between the top and bottom members. The contiguous wall member 8 joins the edges of the top and bottom members to form a shell having an interior space. A plurality of inwardly directed indentations 9 in the top and bottom members extend toward and adjacent to the opposite member and serve to provide internal support to the sole component structure. As indicated, the indentations can be in one or both of the top and bottom members.

FIGS. 3–4 showing top and bottom members, FIG. 5 showing unjoined sole component halves, and FIGS. 6–7 showing cross sections of the midsole 4 taken along lines 4—4 and 5—5 as shown in FIG. 2, further illustrate the inwardly extending support members. As illustrated, the indentations can take a variety of shapes for forming internal support members. In the forefoot region are indented conal-shaped pins 10, extending from the top member 40, and corresponding conal-shaped pins 11 extending from the bottom member 41, which extend into the interval between the top and bottom members. Channels extending across the forefoot region form flex grooves 12 in the upper sole component half and corresponding flex grooves 13 in the lower sole component half. The flex grooves 12 and 13 also cooperate in the interior of the sole component to form ribbed support members when the component halves are joined. In the arch region or mid section of the sole component, inwardly extending conal-shaped pins 14 extend toward and cooperate with platform member 15. Platform member 15 is formed by an indentation in the lower sole component half. The heel region is shown having a large pin member 18 extending inwardly from the upper sole component half towards a corresponding pin member 19 in the lower sole component half. Inwardly extending channels 16 and 17 in the upper and lower sole components halves also cooperate to form internal ribbed support members extending from the lateral portions of the mid section of the sole component rearward around the large pin members 18 and 19. In the embodiment illustrated, the large pin/pin arrangement cooperates with the concentrically arranged channels to form a "donut" in the heel of the sole component. The sidewall member 8 is shown having vertical convolutions 20 which cooperate with corresponding convolutions 21 along the periphery of the lower component half to provide additional structural support along the component's periphery.

As illustrated, support members can cooperate by the contact between corresponding indentations in the upper and lower sole component halves. FIGS. 8–9 illustrate a contact point between two indented materials to form cooperating support members in accordance with one embodiment of the present invention when the upper and lower sole component halves, such as those illustrated in FIGS. 3–7 are joined. Referring to FIGS. 8–9, upper conal-shaped member 10 formed in the upper sole component half 40 is contacted with a corresponding conal-shaped member 11 formed in the lower sole component half 41. The point of contact can be fixed or non-fixed. If fixed, the indentations can be joined at their contact point such as by gluing, fusing, welding or the like.

In some instances the inwardly directed indentations touch or rest against the opposing sole component member or corresponding indentations in the opposing sole component member, but are not attached or joined to the corresponding points on the opposing member. For example, pins 14 in the arch area of the top member can extend into the sole interior towards and proximate to the indented platform 15 in the bottom member, but remain detached from the platform. In some instances the design might indicate that indentations not engage the opposite member until a sufficient amount of pressure is applied on the top or bottom sole component member to cause contact between the indentation and the corresponding opposite member portion.

Taking into account the general physical properties of the thermoplastic materials employed, the size, type and grouping of support members are determined by the functional requirements of the intended sole. For example, the pressure exerted by a foot on a sole is at the highest under the ball of the foot and under the heel. Accordingly, materials, support members, and location of support members are selected to provide more cushioning and stability in these areas of the sole. Similarly, areas of the sole requiring more rigidity employ materials, support members, and support member locations which provide increased stiffness or rigidity. For example, pins can be grouped closer together where foot pressures on a sole would be expected to be greatest and consequently more resistance is required. Another example is the use of different support member shapes in conjunction with each other to provide precise areas of cushioning and support. For example, pins can be made larger in areas where foot pressures are greatest, such as in the heel region of the sole, to provide a more cushioned heel striking location. The cushioned heel strike area can be surrounded by smaller, more densely grouped pins, or by a ribbed support member, to provide increased heel stability at the periphery of the heel region. Lateral stability can be enhanced by the addition of walls extending upward along the periphery of the top member. For example, referring to FIG. 10, a cup sole formed by the addition of walls 22 and 23 can be molded into the sole component to provide an integrated sole component having added lateral support for activities such as tennis.

As stated, the polymers selected for constructing the present invention must be flexible enough to function as a sole component. Generally, flexible means the shaped polymer component will bend or give in response to an applied force without cracking or breaking in its hardened state. Particularly preferred polymers for use in the present invention are elastomers which have high elongation. In general, the greater the elongation the greater the flex life and resilience of the sole component. Good elongation properties are also desirable to create an adequate range of cushioning in the sole, as well as creating the immediate comfort for which athletic soles have become known. For example, polymers with an elongation at break of about 250% to about 300% or more as measured according to ASTM D 638 are representative of desirable polymers for use in the present invention. Preferably, the sole component will have a flex life of about at least 50,000 flexes. An indicator of such desirable flex life can be determined, for example, by the use of flexing machines such as the Satra/Bata belt flexing machine manufactured by Satra Footwear Technology Centre, Kettering, Northhamptonshire, England. In actual use, preferred sole components should withstand at least about one million foot strikes.

In addition, the hardness of the material is important to desirable sole component characteristics such as sole integrity, lateral stability, etc. In addition, harder materials permit the use of thinner materials for constructing the sole component and thus decrease the weight of the component. Generally, preferred polymers will have a hardness ranging from about 70 on the Shore A scale up to about 55 on the Shore D scale (ASTM D 2240). Other preferred characteristics of the sole component material are: (1) formability, i.e., the ability of the material to be molded into the desired component shape, (2) abrasion resistance, (3) clarity, (4) good tear strength, (5) low density, (6) good tensile strength, (7) the ability to integrate the material into existing footwear manufacturing methodology, (8) the ability to color the material, and (9) cost. High tensile strength is desired for coping with high shear forces encountered during high activity use such as running. In addition, high tensile strength permits the sole to be molded thinner. Clarity is important in achieving sharp color contrast, which is vital to acceptable sole decoration. Transparency is another consideration where the cosmetic design of the shoe includes a transparent portion of the sole as fashion and industry trends might dictate. Integration into existing footwear manufacturing processes includes such factors as ease of cementing the component to other shoe materials.

As indicated, the sole component is preferably constructed of a thermoplastic resin. Preferable materials are those which are easily thermoformable into desired flexible sole component configurations. Materials which can be thermoset after molding and retain the flexible characteristics for the sole components of the present invention are included within the scope of preferred thermoformable materials. Thermoset resins solidify or set irreversibly when heated due to crosslinking between the polymer chains. Crosslinking can be achieved by using nucleating agents, mold temperatures above the materials forming temperature, radiation, etc. A thermoset resin once set or cured cannot be softened again by heating. Thermoset resins are generally characterized by high thermal stability, high dimensional stability and high rigidity and hardness and include resins such as polyesters and urethanes.

Thermoplastic resins can be either crystalline or amorphous and can be repeatedly softened by heating. Amorphous thermoplastics include acrylonitrile-butadiene-styrene (ABS) copolymer, styrene, cellulosics and polycarbonates. Crystalline thermoplastics include nylons, polyethylene, polypropylene and polyurethane. Examples of particularly preferred materials for use in the present invention include thermoplastic polyurethanes, nylons, polyesters, polyethylenes, polyamides and the like.

The following descriptions further illustrate the types of desirable materials for use in the present invention. Thermoplastic polyurethanes exhibit good flex life, especially at higher hardnesses, good abrasion resistance, cementing ease, good elongation and clarity. Examples of particularly preferred thermoplastic polyurethanes are the Elastollan® 1100 series of polymers manufactured by BASF Corp., Parsippany, N.J. Properties of representative Elastollan® polymers are provided in the table below.

| PROPERTY | ASTM | UNITS | GRADES | | |
|---|---|---|---|---|---|
| | | | 1190A | 1154D | 1154D |
| Specific Gravity | D-792 | gr/cc | 1.13 | 1.16 | 1.19 |
| Hardness | D-2240 | Shore D | 42 ± 2 | 53 ± 2 | 73 ± 2 |
| Tensile Strength | D-412 | MPa | 32 | 40 | 40 |
| Elongation @ Break | D-412 | % | 575 | 460 | 350 |
| Abrasion Resistance | D-1044 | mg | 45 | 75 | 75 |

Nylons exhibit good tensile strength and thus can be molded thinner. In addition, they have low density, and are therefore lighter, and exhibit good flex life. An example of a preferred nylon polymer for use in the present invention is Zytel 714 manufactured by E.I. DuPont de Nemours & Co., Wilmington, Del. Representative properties of Zytel 714 are provided in the following table:

| PROPERTY | ASTM | UNITS | ZYTEL 714 |
|---|---|---|---|
| Specific Gravity | D-792 | gr/cc | 1.02 |
| Hardness | D-2240 | Shore D | 55 |
| Tensile strength | D-638 | MPa | 27.2 |
| Elongation @ Break | D-638 | % | 260 |

Polyesters exhibit good low density, cementing ease, tensile strength and elongation. An example of preferred polyester polymers are various polymers of the Hytrel series of thermoplastic elastomers manufactured by E.I. DuPont de Nemours and Company. Hytrel polymers are block copolymers of polybutylene terephthalate and long-chain polyether glycols. Properties of representative examples of Hytrel polymers are provided in the following table:

| PROPERTY | ASTM | UNITS | GRADES | | |
|---|---|---|---|---|---|
| | | | 4056 | 5555HS | G-4774 |
| Specific Gravity | D-792 | gm/cc | 1.16 | 1.16 | 1.20 |
| Hardness | D-2240 | Shore D | 40 | 55 | 47 |
| Tensile Strength | D-638 | MPa | 28 | 40 | 20.7 |
| Elongation @ Break | D-638 | % | 550 | 500 | 275 |

Polyamides exhibit good tear strength, high resilience, low density, good flex life and clarity. An example of a preferred polyamide material is Pebax manufactured by Atochem, Paris, France, which is a polyether block amide thermoplastic elastomer. Properties of representative Pebax polymers are provided in the following table:

| PROPERTY | ASTM | UNITS | GRADES | | |
|---|---|---|---|---|---|
| | | | 533 | 4033 | 3553 |
| Specific Gravity | D-792 | gm/cc | 1.01 | 1.01 | 1.01 |
| Hardness | D-2240 | Shore D | 55 | 40 | 35 |
| Tensile Strength | D-638 | MPa | 44 | 36 | 34 |
| Elongation @ Break | D-638 | % | 455 | 485 | 710 |

Another example of a preferred polymer is Surlyn, manufactured by E.I. DuPont de Nemours and Company. Surlyn is an tonically crosslinked thermoplastic polymer (ionomer) of ethylene and methacrylic acid copolymers which exhibit good tear strength, low density, and good flex life. Properties of Surlyn ionomers are provided in the following table:

| PROPERTY | ASTM | UNITS | GRADES | |
| --- | --- | --- | --- | --- |
| | | | 9020 | 9450 |
| Specific Gravity | D-792 | gm/cc | 0.96 | 0.94 |
| Hardness | D-2240 | Shore D | 55 | 54 |
| Tensile Strength | D-638 | MPa | 26.2 | 21.4 |
| Elongation @ Break | D-638 | % | 510 | 500 |

As stated, the description of properties of specific polymers is for the purpose of illustrating the types of polymers having desirable properties for use in the sole components of the present invention. Many other polymers with similar properties are suitable for use in the present invention. Moreover, the data provided is based on available information and cannot be used for direct comparisons among polymers or for guiding precise design specifications. For example, ASTM testing permits alternative methods for developing property data. In addition, other ingredients added to polymers, such as fillers, reinforcing agents, colorants, etc., can cause variations in properties.

A preferred method of constructing the sole component of the present invention is to mold sheets of a flexible high polymer plastic resin to form upper and lower sole component halves and then joining the halves to complete the sole component. Preferred materials, as stated, are sheets of flexible thermoplastic resins which can be heated and molded into desired sole component shapes. An example of a particularly preferred thermoplastic sheet material is 94 Shore A thermoplastic polyurethane sheet such as is available from Argotech, Inc., Greenfield, Mass. Sheets are generally about 0.010 inches thick. The thickness of the sheet is selected according to design criteria, but will generally range from about 0.040 to about 0.100 inches depending on the particular material properties. For example, particularly preferred thicknesses for 94 Shore A thermoplastic polyurethane ranges from about 0.060 inches to about 0.080 inches.

In one embodiment of the present invention, a sheet of a first flexible thermoformable material is heated to its forming temperature and then molded in a corresponding first mold configured to form from the material an upper sole half having a top foot-platform member. A sheet of a second flexible thermoformable material is heated to its forming temperature and molded in a corresponding second mold configured to form from the material a lower sole component half having a bottom sole component member. The molds are further configured to provide indentations in one or both of the top and bottom members formed from corresponding protrusions in one or both of the molds. For example, FIGS. 3–5 show molded but unjoined sole component halves wherein the upper sole component half 40 and lower sole component half 41 mirror the respective upper and lower molds having a plurality of indentation forming protrusions. Once molded, the upper and lower sole component halves are cooled sufficiently for removal from the mold and are then joined together such as by gluing, fusing, welding, coupling with separate coupling members such as rivets and the like, or by other suitable attachment means.

One advantage of the construction method of the present invention is the ability to use two different materials having different properties to create a variety of functional values not possible with one material. For example, the sole component can be constructed of materials having different thicknesses. Moreover, the shapes used to create function in the sole component can all be connected during the molding process. This is highly advantageous when constructing a sole component having adequate cushioning and stability, without adding additional costly operations. For example, a particularly preferred method of constructing the sole component of the present invention is through the use of specially designed twin-sheet thermoforming molds and techniques.

Thermoforming in general is a process of shaping thermoplastic resin by heating a sheet or film of the plastic resin to a temperature sufficient to make the resin pliable enough to be shaped into a desired form. Generally, the material is heated uniformly throughout to its normal forming temperature. The normal forming temperature is determined by heating the material to the highest temperature at which it still has enough hot strength to be handled, yet is below the degrading temperature of the material. Preferably, the material will have a hot tensile strength adequate to allow the material to stretch uniformly onto and around the mold. The material at its forming temperature is then clamped at its edges and forced into a one-sided mold, typically a temperature-controlled aluminum mold, by applying a vacuum to the mold side of the material to force the material into the mold. Positive air pressure is also typically applied to the material surface opposite the mold side of the material to assist in forcing the material firmly into the mold. When the sheet material is at its forming temperature, the material is essentially annealed (stress-relieved). To avoid forming in stress, the hot sheet should be forced against the mold as rapidly as possible by application of the vacuum and air pressure. Once molded, the part is cooled to its set temperature which is the temperature at which the part hardens sufficiently to permit removal of the part from the mold without deforming the molded part. The molded part is then trimmed of excess material, which is generally present at the edges of the molded article where it has been clamped. The excess material can be recycled if desired.

Twin-sheet thermoforming in particular uses two sheets of material heated to their forming temperatures, the upper sheet forced up into an upper mold half and a lower sheet forced down into a corresponding lower mold half. The two mold halves are pressed together and the pressure of the two molds squeezing the sheets together at their forming temperature effectively welds the two materials together at their points of contact. As illustrated in FIGS. 3–7, the points of contact can be along the periphery of the upper and lower sole component halves and between indentations and corresponding portions of the opposite member. In addition, points of contact can be between corresponding indentations. As indicated, air pressure can be applied between the sheets to assist in forcing the material firmly into the molds. Particularly preferred materials for twin-sheet thermoforming should exhibit good specific heat, i.e., the hot sheet retains its temperature for a sufficient time in the process to easily join surfaces at their contact points. Thermoplastic polyurethane, for example, exhibits good specific heat.

Figure 11:
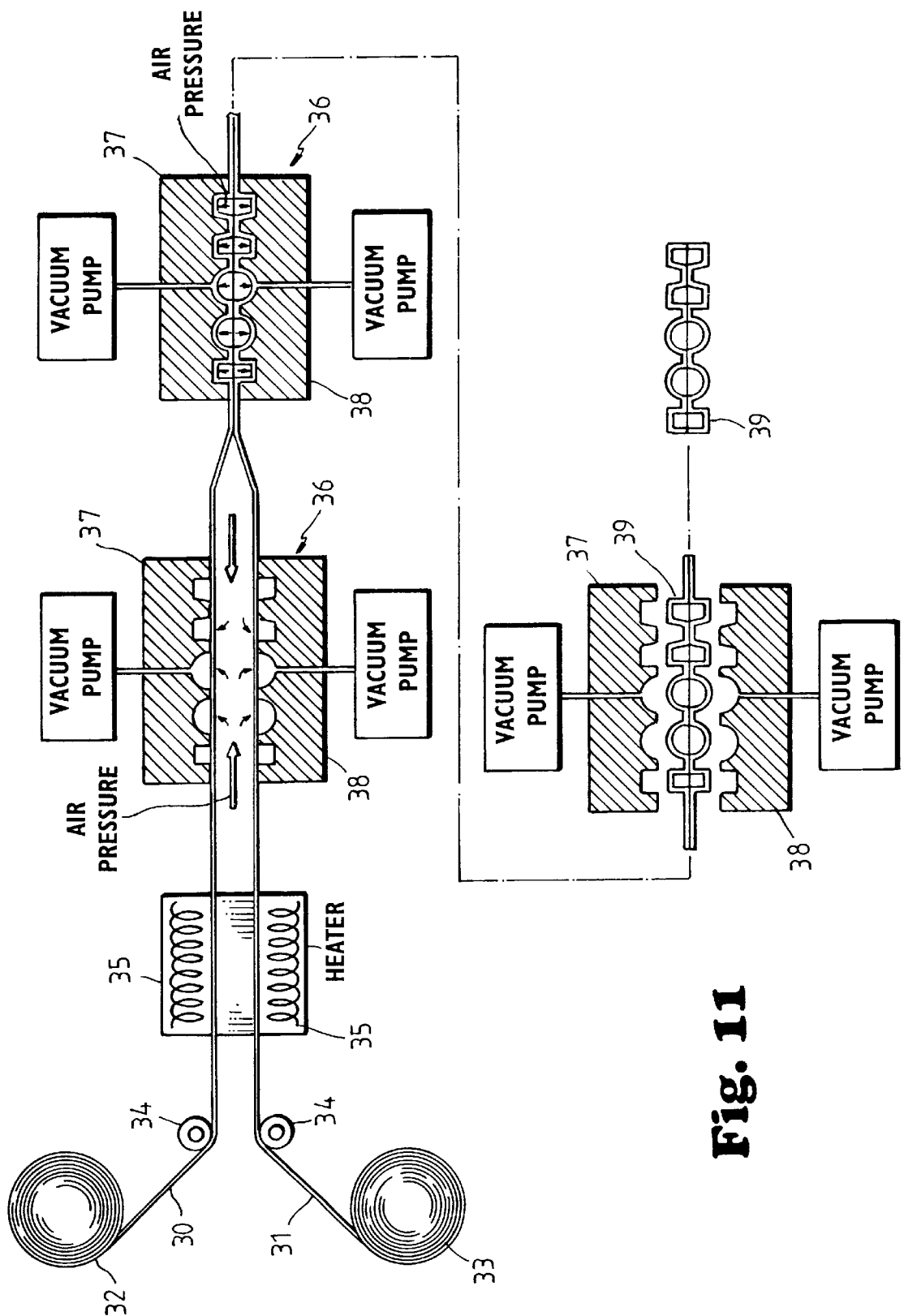
FIG. 11 is a schematic illustrating a twin-sheet thermoforming process.

The present invention's process of thermoforming the shoe sole component is illustrated generally by reference to FIG. 11. Referring to FIG. 11, two rolls of thermoplastic sheet stock 30 and 31 are fed from rolls 32 and 33 over rollers 34 to sheet stock heaters 35 to raise the temperature of the sheet stock to substantially its normal forming temperature. The sheet stock is then advanced to the form station 36 having an upper sole component mold 37 and a lower sole component mold 38. The mold halves are closed together and the vacuum is applied to the mold halves to force the upper sheet material into the upper mold 37, and the lower sheet material into the corresponding lower mold 38. Air pressure can also be applied between the sheets to assist in forcing the materials firmly into the molds. The mold halves remain closed together for a time sufficient to weld the upper and lower materials together at their points of contact. For 94 Shore A thermoplastic polyurethane of 0.060 to 0.080 inches thick, for example, the sheets are molded at about 400° F. and a cycle time of about 20 seconds. The mold halves are then retracted and the formed sole 39 is removed from the mold after sufficient cooling and advanced further down the line for trimming.

Thermoforming has many advantages over other types of molding, including blow molding, when it comes to producing a sole component that is capable of delivering adequate function. Thermoformed soles have tight tolerances as compared to other foam or partial-foam soles. Cushioning, flexibility, stability, etc. are more predictable with the materials used in thermoforming and thus makes more feasible the application of foot dynamics research to shoe design. Moreover, as illustrated, the thermoformed material can be curved or bent at various angles to provide a variety of indented shapes to create regions of selected resistance in the sole to the pressures exerted by the foot and by ground contact. Therefore the invention lends itself to a variety of alternative embodiments as dictated by design considerations. For example, the shapes can be conal-shaped, such as conal-shaped "pins," ridges, cubes, platforms, ribs and the like.

As described, the upper and lower sole component halves can be constructed of different thermoplastic materials. Accordingly, a number of advantages can be engineered into the sole. For example, the top member can be composed of a thicker, heavier thermoplastic material, while the bottom member is composed of a thinner, lighter thermoplastic material. Similarly, having corresponding support members of two different materials increases the ability of the designer to construct differing degrees of flexibility or resistance into specific areas of the sole component. By varying the materials employed in terms of specific properties such as tensile strength, material thickness and elongation and by varying indentation configurations to form support members, a number of consistently reproducible regions of desired resistance and flexibility can be engineered into the sole to meet specific requirements. For example, in pin/pin arrangements, a thicker, more rigid material can be employed as the top member and a thinner, more flexible material can be employed as the bottom member. The upper pin portion extending from the top member from a stiffer material, would form a more rigid upper pin portion. The lower pin member extending from the bottom sole member would provide a more flexible, "softer" lower support member. Consequently, cooperating support members are provided having dual characteristics enabling the functional response of the support members to be more precisely engineered. In addition, where the component includes a wall member, the wall member can be formed from two materials, i.e., the wall can be split between the upper and lower sole component halves.

Thermoforming also offers additional advantages. Thermoforming is efficient and cost effective. Blow molding, for example, requires numerous mold changes to make all the various sizes of right and left soles. Such mold changes are not economically desirable. Thermoforming should permit a sole unit per mold time advantage of at least 5 to 10 times. In addition, blow molding can use only 1–4 molds per cycle. The entire sole size range of approximately 36 molds can be thermoformed in one cycle. In addition, the thermoforming process can utilize laminate or printed graphics attached to the plastic sheeting before forming. This permits high precision graphics and unlimited color use. Four-color photo processes could be used for example. Molds can also be configured to add texture to the component material. Moreover, the thermoforming process does not stretch the hot plastic nearly as much as blow molding. Limiting stretching is vital to keeping graphics acceptable. Stretching also affects the consistency of the material's thickness, which in turn affects the consistency of the sole component's function.

Figure 13:
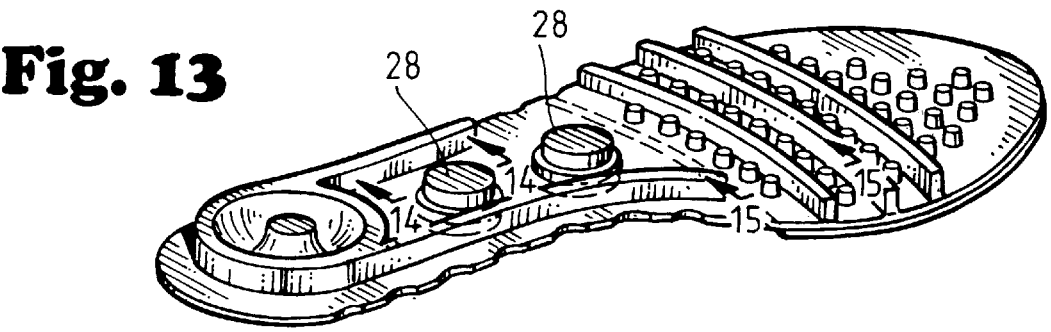
FIG. 13 is a perspective view of the lower half of the sole component with outsole members according to the embodiment of the present invention shown in FIG. 12.
Figure 12:
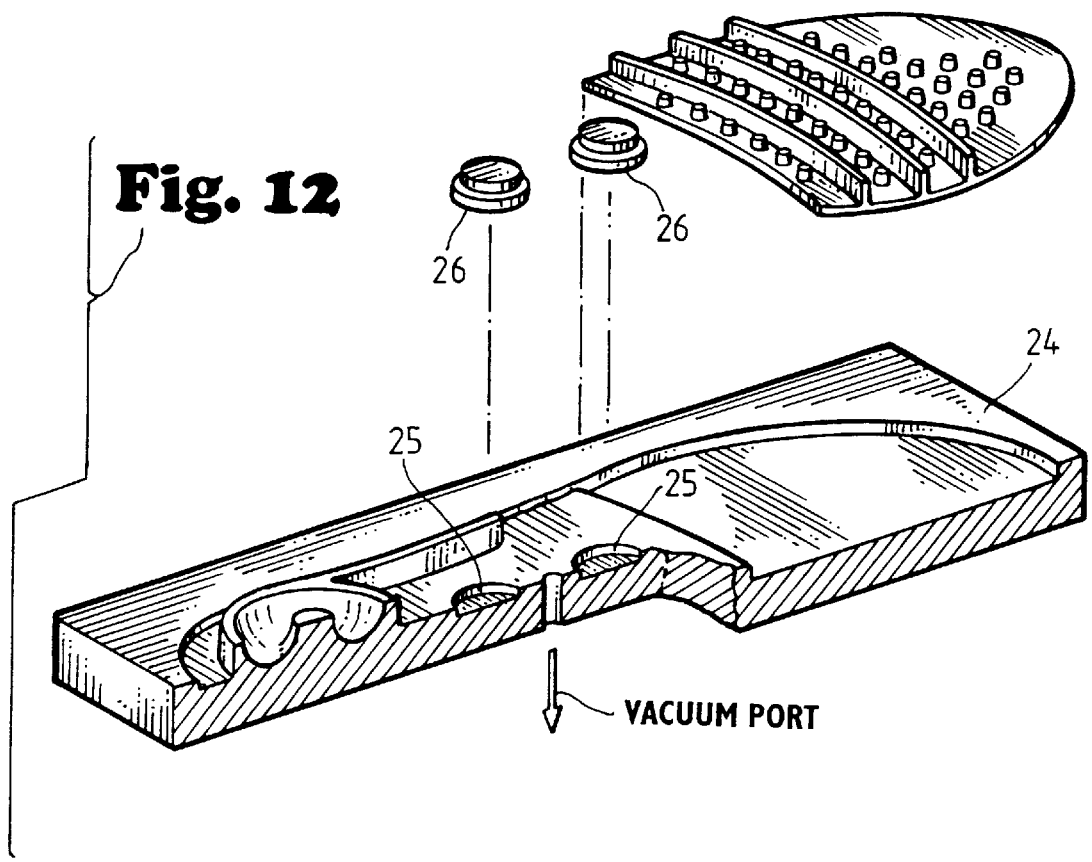
FIG. 12 is a perspective partial cutaway exploded view of a sole component mold, corresponding lower sole component portion and outsole members according to one embodiment of the present invention.

The present invention also lends itself to a number of alternative design considerations. The interval can contain foam, such as traditional EVA foam, as consumer or user demands might dictate. One or more recesses such as circular shaped indentations or channels can be molded into the sole component to provide receptacles for cooperating with locking members protruding from outsole materials to attach an outsole to the bottom member of the sole component. In addition, an outsole can be attached to the sole component during the molding process. This is further illustrated by reference to FIGS. 12–15. FIG. 12 shows a partial cutaway view of a lower sole component mold half 24 in accordance with one embodiment of the present invention wherein outsole member recesses 25 are designed into the mold. Prior to molding the lower sole half, outsole material 26, such as synthetic rubber material, is positioned in the corresponding recesses 25. The material 27 for the lower sole component half is molded around protrusions 26a extending from the outsole material thereby locking the outsole material into the sole component as illustrated in FIG. 13 showing indentations 28 in locking cooperation with the outsole material 26. Referring to FIGS. 14–15, vacuum ports 29 in the recesses cooperate with channels in the outsole material which permits communication between the vacuum ports and the interior of the mold to permit the applied vacuum pressure to pull the hot sole component material around the protrusions of the outsole material. FIG. 15 illustrates an alternative embodiment wherein a plurality of protrusions extend from an outsole member recessed in the mold. An adhesive can be applied to the outsole material prior to molding to ensure adequate bonding between the sole component and the outsole material. The indentations housing the outsole material can also function as support members. In a preferred embodiment, the outsole would cover indentations in the bottom member to prohibit dirt and other foreign material from becoming lodged in the indentations.

Figure 18:
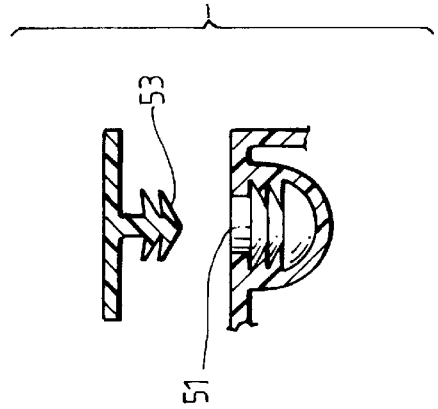
FIG. 18 is a side cross sectional view of the shoe upper and sole component attachment means illustrated in FIGS. 16–17.
Figure 16:
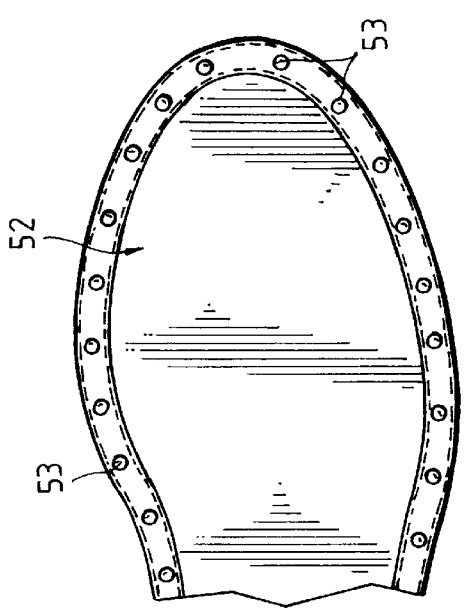
FIG. 16 is a bottom plan view of a shoe upper showing one half of an attachment means according to one embodiment of the present invention.
Figure 17:
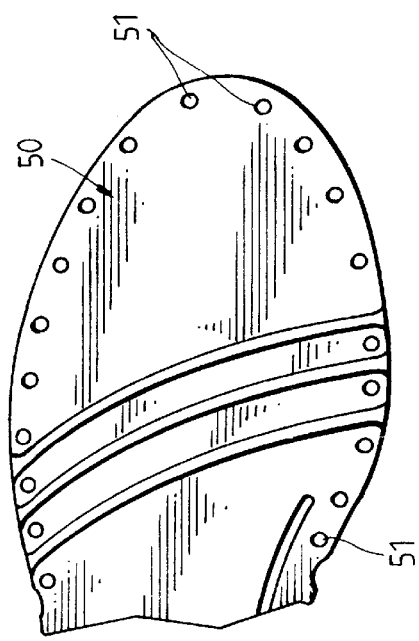
FIG. 17 is a top plan view of a sole component according to one embodiment of the present invention showing the corresponding attachment means illustrated in FIG. 11.

The sole of the present invention can be attached to an upper in a variety of ways as well. One traditional method is simply to cement the sole to the upper. Thermoforming, however, lends itself to particularly advantageous means for attaching the sole component to an upper. For example, cementless attachment mechanisms include a series of one-way snaps which fit into receptacles in either the shoe upper or the sole to lock the shoe upper to the sole. Preferably, the top member of the sole would be thermoformed with receptacles around the periphery of the upper surface of the sole member's top and designed to accept corresponding one-way snaps extending outwardly from the periphery of the bottom of the shoe upper. Referring to FIGS. 16–18, the upper surface of the top member of the sole 50 in accordance with the present invention is shown wherein snap receptacles 51 are positioned along the periphery or outside edge of the upper surface of the sole. The lower surface of the shoe upper 52 includes outwardly extending one-way snaps 53 positioned along the periphery of the lower surface of the shoe upper to correspond to the location of the receptacles in the sole. FIGS. 19–21 illustrate an alternative embodiment wherein a locking channel 54 is molded into the upper surface of the top member of the sole 50 along its periphery and a corresponding lipped rib member 55 extends downward from the lower surface of the shoe upper 52. The lip is engaged in the locking channel to attach the shoe upper to the sole.

The foregoing description is for the purpose of illustrating the invention. Many other variations will be apparent to those of ordinary skill in the art and all such variations are encompassed within the scope of the present invention.

What is claimed is:

1. A shoe sole component comprising:
   (a) a flexible top sheet made from a high polymer resin and having substantially uniform thickness, an outer periphery, and a plurality of hollow, resiliently compressible indentations molded into the top sheet, each of the indentations having an upwardly facing recess and a downwardly facing projection;
   (b) a flexible bottom sheet made from a high polymer resin and having substantially uniform thickness, an outer periphery, and a plurality of hollow, resiliently compressible indentations molded into the bottom sheet, each of the indentations having a downwardly facing recess and an upwardly facing projection;
   (c) the top and bottom sheets joined at their outer peripheries whereby the top and bottom sheets are in spaced relation to one another to define a cavity therebetween, the projections of the indentations in the top and bottom sheets extending into the cavity, at least one of the indentations in the top sheet abutting an indentation in the bottom sheet.

2. The shoe sole component of claim 1 wherein at least one of the indentations is cone-shaped.

3. The shoe sole component of claim 1 wherein at least one of the indentations is rib-shaped.

4. The shoe sole component of claim 1 wherein at least one of the indentations in the top sheet is joined to an indentation in the bottom sheet.

5. The shoe sole component of claim 1 further comprising a wall member extending between at least a portion of the peripheries of the top and bottom sheets.

6. The shoe sole component of claim 1 further comprising at least one hole through at least one of the top and bottom sheets to allow free passage of air into and out from the cavity.

7. A shoe sole component comprising a flexible thermoplastic body configured for incorporation into a shoe, said body member further comprising:
   (a) a top member formed from a flexible sheet of substantially uniform thickness, having an outer periphery and a plurality of hollow, resiliently deformable indentations therein, each of the indentations having a downwardly facing projection and an upwardly facing recess;
   (b) a bottom member formed from a flexible sheet of substantially uniform thickness, having an outer periphery and a plurality of hollow, resiliently deformable indentations therein, each of the indentations having an upwardly facing projection and a downwardly facing recess;
   (c) means for joining the top and bottom members along at least a portion of their outer peripheries whereby the members are in at least partially spaced relation to one another defining a cavity therebetween, the projections of the indentations in the top and bottom members extending into the cavity, a plurality of the indentations in the top member abutting the indentations in the bottom member.

8. The shoe sole component of claim 7 wherein at least one of the indentations is cone-shaped.

9. The shoe sole component of claim 7 wherein at least one of the indentations is rib-shaped.

10. The shoe sole component of claim 7 wherein at least one of the indentations in the top member is joined to an indentation in the bottom member.

11. The shoe sole component of claim 7 further comprising a wall member extending between at least a portion of the peripheries of the top and bottom members.

12. The shoe sole component of claim 7 further comprising at least one hole through at least one of the top and bottom members to allow free passage of air into and out from the cavity.

13. The shoe sole component of claim 1 wherein the flexible top sheet and bottom sheet each have a thickness of between 0.040 and 0.100 inches.

14. The shoe sole component of claim 7 wherein the top member and bottom member each have a thickness of 0.040 and 0.100 inches.

* * * * *